(12) United States Patent
Plaehn et al.

(10) Patent No.: US 12,397,776 B2
(45) Date of Patent: Aug. 26, 2025

(54) METHOD FOR THE AUTOMATED GUIDANCE OF A VEHICLE, JOURNEY CONTROL UNIT AND VEHICLE

(71) Applicant: ZF CV SYSTEMS GLOBAL GMBH, Bern (CH)

(72) Inventors: Klaus Plaehn, Seelze (DE); Oliver Wulf, Neustadt (DE); Jonas Boettcher, Hannover (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 257 days.

(21) Appl. No.: 18/042,000

(22) PCT Filed: Jul. 20, 2021

(86) PCT No.: PCT/EP2021/070203
§ 371 (c)(1),
(2) Date: Feb. 17, 2023

(87) PCT Pub. No.: WO2022/037874
PCT Pub. Date: Feb. 24, 2022

(65) Prior Publication Data
US 2023/0322207 A1    Oct. 12, 2023

(30) Foreign Application Priority Data

Aug. 19, 2020   (DE) ..................... 10 2020 121 733.1

(51) Int. Cl.
| | | |
|---|---|---|
| B60W 30/00 | (2006.01) |
| B60W 10/04 | (2006.01) |
| B60W 10/18 | (2012.01) |
| B60W 10/20 | (2006.01) |
| B60W 30/045 | (2012.01) |
| B60W 50/00 | (2006.01) |
| B60W 60/00 | (2020.01) |

(52) U.S. Cl.
CPC .......... *B60W 30/045* (2013.01); *B60W 10/04* (2013.01); *B60W 10/18* (2013.01);
(Continued)

(58) Field of Classification Search
CPC .... B60W 30/045; B60W 10/04; B60W 10/18; B60W 10/20; B60W 50/0097;
(Continued)

(56) References Cited

U.S. PATENT DOCUMENTS

2006/0273657 A1 * 12/2006 Wanke ................ B60T 8/17555
                                                                        303/146
2007/0008090 A1 *  1/2007 Gertsch .................. B60T 8/243
                                                                        340/435
(Continued)

FOREIGN PATENT DOCUMENTS

| CN | 109017758 A | 12/2018 |
| CN | 109050658 A | 12/2018 |

(Continued)

*Primary Examiner* — Peter D Nolan
*Assistant Examiner* — Peter Y Ning
(74) *Attorney, Agent, or Firm* — LEYDIG, VOIT & MAYER, LTD.

(57) ABSTRACT

A method for automated guidance of a vehicle along a specified setpoint trajectory at an actual speed, wherein the setpoint trajectory includes geometric trajectory variables, the method including ascertaining an actual deviation of the vehicle from the setpoint trajectory and outputting the ascertained actual deviation and generating manipulated variables such that the vehicle, in the case of automated control of a drive system and/or a braking system and/or a steering system of the vehicle, moves closer to the setpoint trajectory. The method also includes ascertaining whether an undesirable driving state is present when the vehicle moves closer to the setpoint trajectory, wherein the undesirable driving state is ascertained from the specified setpoint trajectory based on the geometric trajectory variable, and, if the presence of the undesirable driving state is identified, automatically controlling the vehicle based on generated stability variables and/or adapting the setpoint trajectory.

26 Claims, 5 Drawing Sheets

(52) U.S. Cl.
CPC ........ *B60W 10/20* (2013.01); *B60W 50/0097* (2013.01); *B60W 60/001* (2020.02); *B60W 2520/06* (2013.01); *B60W 2520/10* (2013.01); *B60W 2520/125* (2013.01); *B60W 2520/14* (2013.01); *B60W 2520/26* (2013.01); *B60W 2530/10* (2013.01); *B60W 2710/18* (2013.01); *B60W 2710/20* (2013.01); *B60W 2720/10* (2013.01); *B60W 2720/18* (2013.01)

(58) Field of Classification Search
CPC ........... B60W 60/001; B60W 2520/06; B60W 2520/10; B60W 2520/125; B60W 2520/14; B60W 2520/26; B60W 2530/10; B60W 2710/18; B60W 2710/20; B60W 2720/10; B60W 2720/18; B60W 2300/14; B60W 2520/18; B60W 2720/125; B60W 2720/14; B60W 10/184; B60W 30/02; B60Y 2200/147

See application file for complete search history.

(56) References Cited

U.S. PATENT DOCUMENTS

| | | | | |
|---|---|---|---|---|
| 2007/0185638 A1* | 8/2007 | Odenthal | ............... | B60W 40/11 701/70 |
| 2012/0283907 A1* | 11/2012 | Lee | .................... | B60T 8/17557 701/32.9 |
| 2013/0218396 A1* | 8/2013 | Moshchuk | ............. | G08G 1/165 701/25 |
| 2014/0032049 A1* | 1/2014 | Moshchuk | ............. | G08G 1/166 701/42 |
| 2015/0105990 A1* | 4/2015 | Chimner | ............... | B60W 30/02 701/1 |
| 2017/0115662 A1* | 4/2017 | Mori | .................... | B60W 30/02 |
| 2018/0297587 A1* | 10/2018 | Kasaiezadeh Mahabadi | ............... | B60W 50/00 |
| 2018/0348769 A1* | 12/2018 | Sato | ...................... | B60W 30/02 |

FOREIGN PATENT DOCUMENTS

| | | | | |
|---|---|---|---|---|
| CN | 109552312 A | 4/2019 | | |
| CN | 109823393 A | 5/2019 | | |
| DE | 102012207548 A1 | 11/2012 | | |
| DE | 102014008199 A1 | 3/2015 | | |
| DE | 102015216236 A1 | 3/2017 | | |
| DE | 102016005966 A1 | 11/2017 | | |
| DE | 102018206018 A1 | 10/2019 | | |
| EP | 2261093 A1 | 12/2010 | | |
| EP | 3088281 A1 * | 11/2016 | ............... | B62D 1/28 |
| EP | 3369634 A1 | 9/2018 | | |
| EP | 3415389 A1 * | 12/2018 | ............ | B60W 30/02 |
| EP | 3486135 A1 | 5/2019 | | |
| WO | WO-2005042321 A1 * | 5/2005 | .......... | B60T 8/17555 |
| WO | WO 2017102682 A1 | 6/2017 | | |

* cited by examiner

METHOD FOR THE AUTOMATED GUIDANCE OF A VEHICLE, JOURNEY CONTROL UNIT AND VEHICLE

CROSS REFERENCE TO RELATED APPLICATIONS

This application is a U.S. National Phase application under 35 U.S.C. § 371 of International Application No. PCT/EP2021/070203, filed on Jul. 20, 2021, and claims benefit to German Patent Application No. DE 10 2020 121 733.1, filed on Aug. 19, 2020. The International Application was published in German on Feb. 24, 2022 as WO 2022/037874 A1 under PCT Article 21(2).

FIELD

The invention relates to a method for the automated guidance of a vehicle, to a journey control unit for carrying out the method, and to a vehicle.

BACKGROUND

It is known from the prior art that vehicles controlled in an automated manner have a "virtual driver", which is implemented by an electronic VD unit and in which there is defined in an automated manner a setpoint trajectory, along which the vehicle is to move in an automated manner. A surroundings acquisition system monitors here whether the vehicle is actually moving along the setpoint trajectory. If there is an actual deviation between the current position of the vehicle and the setpoint trajectory, manipulated variables are ascertained on the basis of this in a first motion control unit, with which corresponding actuators of a drive system and/or of a braking system and/or of a steering system are automatically controlled such that the position of the vehicle moves closer to the setpoint trajectory again. To fulfil this task, the first motion control unit has at its disposal a model, parameters and measurement variables of the vehicle, as well as the methods from the field of control engineering.

The problem here is that when the actuators are controlled with the manipulated variables, the stability of the vehicle can only be ensured at low actual vehicle speeds and on roadways with high friction values. However, an automatically controlled vehicle, for example a commercial vehicle or a bus, which is controlled in an automation stage according to an SAE level between 3 and 5, is also operated at high actual speeds and on roadways with low friction values. Therefore, with such a first motion control unit, a stable driving state cannot be ensured in every automated driving situation, such that undesirable driving states may occur.

Stability control systems are also known that support a manual driver in stability-critical driving situations by means of automated intervention in the drive system and/or the braking system and/or the steering system, wherein this is described by way of example in WO 2017/102682 A1 or CN109017758A. However, these stability control systems are adapted to the behavior of the manual driver, such that they are not applicable in every driving situation to an automated driving situation with a setpoint trajectory specified automatically. The difference here is that the driver's reaction is not predictable, but the driver continues to monitor the driving situation and can also react to a system reaction.

Furthermore, EP2261093A1 provides for monitoring a yaw rate for a future path of the vehicle depending on the driver's behavior. Based on current state parameters and the course of the road, a simulated trajectory is ascertained, along which the driver will probably guide the vehicle manually. Depending on this, a yaw rate-dependent evaluation of the driving state takes place. Also in US2007185638A, CN109050658A and CN109552312 A, the manually controlled vehicle is controlled on the basis of the yaw rate as part of an assistance function in order to set a stable driving state.

In DE 102016005966A1, DE102014008199A1 and US2015105990A, yaw rate monitoring is further provided in which a correction steering angle is set to keep the vehicle stable. In US2007008090A, rollover prevention is also provided by predictively ascertaining a trajectory that is manually specified by the driver.

In US2018297587A1 it is envisaged to determine an ideal state vector for the current point in time and for future points in time from automatically specified requirements for the drive system and/or the braking system and/or the steering system (also for the current point in time and/or for a point in time in the future). A setpoint yaw moment is then ascertained from this ideal state vector and this yaw moment is fed to a stability control system, which in turn influences the vehicle dynamics in an automated manner to avoid instability. Therefore, the driving state is ascertained based on automatically specified setpoint requirements, and a yaw moment-dependent stability control is performed.

SUMMARY

In an embodiment, the present disclosure provides a method for automated guidance of a vehicle along a specified setpoint trajectory at an actual speed, wherein the setpoint trajectory includes geometric trajectory variables, the method comprising ascertaining an actual deviation of the vehicle from the setpoint trajectory, outputting the ascertained actual deviation and generating manipulated variables based on the ascertained actual deviation such that the vehicle, in the case of automated control of a drive system and/or a braking system and/or a steering system of the vehicle, moves closer to the setpoint trajectory based on the generated manipulated variables if the vehicle deviates from the setpoint trajectory, ascertaining whether an undesirable driving state is present at a current time and/or for a future time when the vehicle moves closer to the setpoint trajectory based on the generated manipulated variables, wherein the undesirable driving state is ascertained from the specified setpoint trajectory based on the geometric trajectory variable, and, if the presence of the undesirable driving state is identified at the current time and/or for a future time, automatically controlling the vehicle based on generated stability variables and/or adapting the setpoint trajectory.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
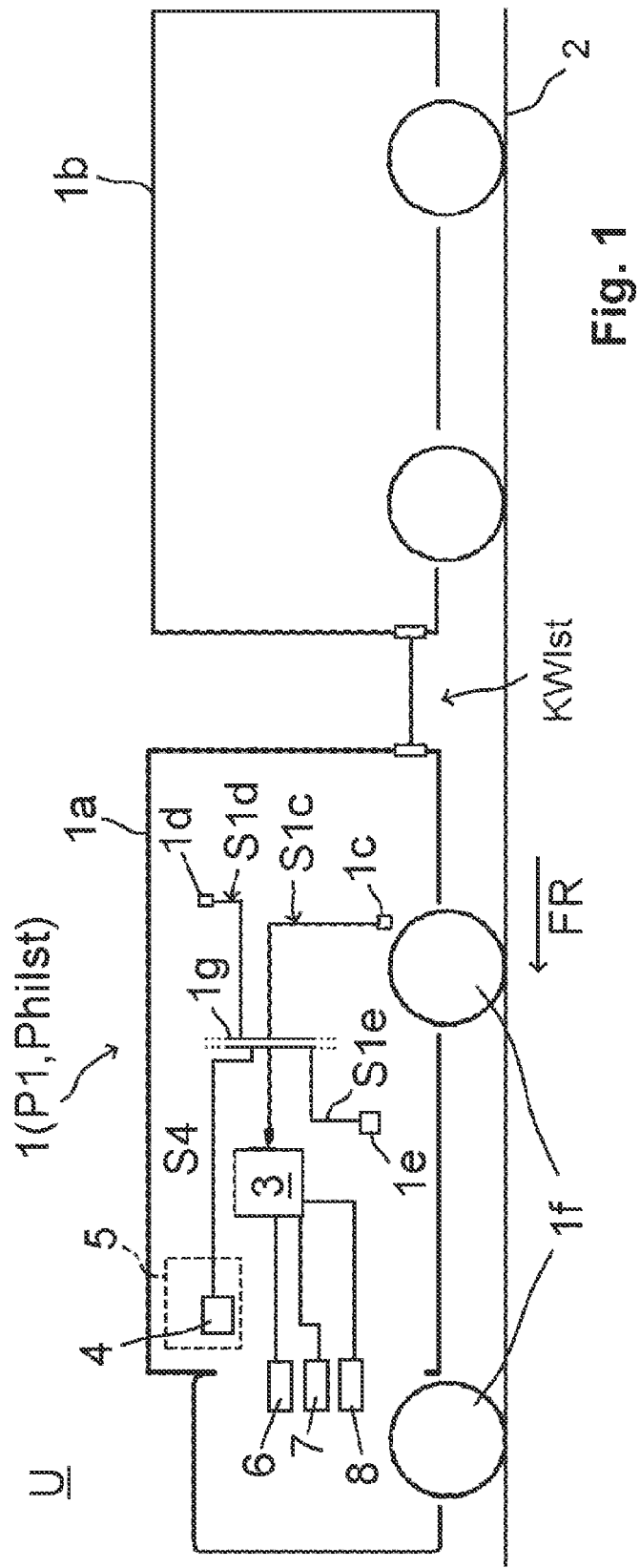
FIG. 1 illustrates a schematic view of an automatically controllable vehicle.

In an embodiment, the present invention provides a method for automated guidance of a vehicle, which ensures safe and reliable operation of the vehicle. In an embodiment, the present invention also provides a journey control unit (also referred to herein as a travel control unit) and a vehicle.

According to an embodiment of the invention, a method is provided for the automated guidance of a vehicle along a specified setpoint trajectory at an actual speed, wherein the setpoint trajectory is characterized by geometric or kinematic trajectory variables, the method comprising at least the following steps:
  ascertaining an actual deviation of the vehicle from the setpoint trajectory at a current time and/or for a future time within a specific time interval, preferably in a VD unit;
  outputting the ascertained actual deviation to a first motion control unit and generating manipulated variables on the basis of the ascertained actual deviation in such a way that, in the case of automated control of a drive system and/or a braking system and/or a steering system of the vehicle, the vehicle moves closer to the setpoint trajectory on the basis of the generated manipulated variables at a current time and/or for a future time within a specific time interval if the vehicle deviates from the setpoint trajectory,
  ascertaining (in a second motion control unit) whether an undesirable driving state is present at a current time and/or for a future time when the vehicle moves closer to the setpoint trajectory on the basis of the generated manipulated variables, wherein the undesirable driving state is ascertained from the specified setpoint trajectory on the basis of the geometric trajectory variables which characterize the setpoint trajectory; and if the presence of an undesirable driving state is determined at the current time and/or for a future time
    controlling the vehicle in an automated manner on the basis of generated stability variables and/or
    adapting the setpoint trajectory.

In this case, the manipulated variables can be overwritten by the stability variables if an undesirable driving state is present, or the manipulated variables can be adapted accordingly on the basis of the stability variables in order to react to an undesirable driving state. The automated control of the vehicle can thus be adapted according to the ascertained driving state. Instead of or in addition to an adaptation on the basis of the stability variables, the setpoint trajectory can also be adapted directly, so that an adapted setpoint trajectory is already specified for the motion controller and an adaptation on the basis of the stability variables is no longer necessarily required. The vehicle then moves automatically along a specified path on which the currently detected undesirable driving states no longer occur or only occur to a lesser extent. This adapted setpoint trajectory can then be fed back into the method according to an embodiment of the invention as a "specified trajectory".

Advantageously, this means that the setpoint trajectory, i.e., the path which is preferably described geometrically by individual setpoint positions and setpoint rotations of the vehicle assigned to them and which is to be followed in the future by automated control of the vehicle, can be used directly to check whether the vehicle is currently or in the future will be prone to instabilities or undesirable driving states. This eliminates the need for a more imprecise analysis of the processed and already issued requests, such that the path specified by the virtual driver is used directly to evaluate stability. This makes the ascertainment of an undesirable driving state more accurate and also independent of the actuators used or the preprocessing prior to the output of the individual requests to the drive system, braking system or steering system. Flexibility is thus increased. Overall, the aim of the method is no longer to support the human driver, e.g. in the case of high lateral dynamics or at a low friction value, but to support the "virtual driver" in exactly the same situations in precisely following the setpoint trajectory (setpoint position and setpoint rotation) specified by the human driver. The "virtual driver" is implemented here in the automatically controlled vehicle by the electronic VD unit. The VD unit defines here a setpoint trajectory along which the vehicle is to move automatically.

Preferably, it is provided that in a method according to an embodiment of the invention:
  the ascertainment of an actual deviation of the vehicle from the setpoint trajectory is performed in a VD unit;
  the generation of manipulated variables on the basis of the ascertained actual deviation is carried out in a first motion control unit; and
  the ascertainment of whether an undesirable driving state is present at a current time and/or for a future time is carried out in a second motion control unit, wherein
  the generation of the manipulated variables in the first motion control unit is carried out independently of the ascertainment of the undesirable driving state in the second motion control unit and/or
  the ascertainment of an actual deviation in the VD unit is carried out independently of the ascertainment of the undesirable driving state in the second motion control unit.

The second motion control unit thus advantageously provides a simple extension option for an existing automated control system in a vehicle with a "virtual driver", who specifies in an automated manner the setpoint trajectory, and a first motion control unit, which automatically implements the movement along the setpoint trajectory, wherein this extension can additionally avoid stability-critical states. This makes it easy to retrofit a method or device according to an embodiment of the invention into a vehicle with an automated control system that does not have automated stability control, since the second motion control unit only has to be connected to the existing system via appropriate interfaces.

Advantageously, however, to avoid stability-critical states during an automated journey, an independent solution can also be provided that can be designed independently of the conventional automated system in the vehicle, which is equipped with a virtual driver and a first motion control unit. The vehicle manufacturer in question can thus design and implement the automated system independently of the system that provides stability during the automated journey. This simplifies the effort for the vehicle manufacturer in question. In principle, however, it is also possible to integrate the individual components for stability into the components of the overall automated system if it is not necessary to retrofit or extend the existing system.

Preferably, it is also provided that the ascertainment of whether an undesirable driving state is present at a current time and/or for a future time is additionally carried out on the basis of vehicle information about the vehicle and/or on the basis of a vehicle actual dynamic and/or on the basis of setpoint requirements for automated control of the drive system and/or the braking system and/or the steering system. Advantageously, this allows an exact comparison of the extent to which the actual behavior of the vehicle deviates from the setpoint behavior and the extent to which this can lead to instability. By additionally taking vehicle parameters into account, other factors influencing stability can also be used. The consideration of the setpoint requirements additionally leads to the fact that in case of a deviation from the current setpoint trajectory, the setpoint dynamics currently requested in response to this can also be included. In particular, this means that a currently "requested" setpoint yaw rate can be included.

Preferably, it is provided here that the setpoint requirements are ascertained on the basis of the actual deviation, wherein longitudinal setpoint requirements are used to correct a position and/or actual rotation of the vehicle deviating from the setpoint trajectory (setpoint position and setpoint rotation) in the direction of travel of the vehicle, and lateral setpoint requirements are used to correct a position and/or actual rotation of the vehicle deviating from the setpoint trajectory (setpoint position and setpoint rotation) perpendicular to the direction of travel. Advantageously, this allows a targeted separation into lateral and longitudinal motion components, which simplifies the subsequent analysis and also the adaptation of the control signals in the event of instability. If only lateral motion components are affected by an instability, these can be adapted in a simple manner without necessarily also noticeably changing longitudinal motion components, and vice versa.

In conjunction with this, it is preferably further provided that a drive manipulated variable and/or a braking manipulated variable and/or a steering manipulated variable are ascertained as manipulated variables on the basis of the actual deviation, wherein the drive system of the vehicle can be automatically controlled on the basis of the drive manipulated variable and the braking system of the vehicle can be automatically controlled on the basis of the braking manipulated variable and the steering system of the vehicle can be automatically controlled on the basis of the steering manipulated variable, in order to approximate the position and/or the actual rotation of the vehicle to the setpoint trajectory (setpoint position and setpoint rotation). Accordingly, manipulated variables can be ascertained separately for each system and, on the basis of the driving state, can also be adapted independently of one another on the basis of the stability variables. This provides increased flexibility.

Preferably, the presence of an undesirable driving state is therefore ascertained if it follows from the specified setpoint trajectory on the basis of the geometric trajectory variables that the vehicle is unstable at the current time and/or an unstable state is imminent for a future time. According to one embodiment, the presence of an undesirable driving state is ascertained here if a yaw rate deviation between a setpoint yaw rate and an actual yaw rate at the current time and/or for a future time exceeds a deviation limit value, wherein the setpoint yaw rate at the current time and/or for a future time follows indirectly or directly from the specified setpoint trajectory on the basis of the geometric trajectory variables. Advantageously, an (imminent) instability can thus be ascertained on the basis of the yaw behavior of the vehicle, which is derived from the geometric setpoint trajectory.

Direct determination of the setpoint yaw rate from the specified setpoint trajectory means that the setpoint yaw rate is ascertained in time from the setpoint position and the setpoint rotation. In the case of an indirect determination of the setpoint yaw rate from the specified setpoint trajectory, reference can be made, for example, to the setpoint requirements that follow directly from the setpoint trajectory. The setpoint requirements can be used to take into account the actual current setpoint dynamics that result from deviations from the setpoint trajectory.

Preferably, if the deviation limit value is exceeded on the basis of the yaw rate deviation, the following can be generated and output as a stability variable
 a first drive stability variable for limiting the actual speed of the vehicle and/or
 a first braking stability variable for reducing the actual speed of the vehicle
in such a way that, in the case of automated control of the vehicle on the basis of the first drive stability variable and/or the first braking stability variable, the actual speed of the vehicle does not exceed a specified limit speed. The particular manipulated variable for the drive or the brakes can thus be specifically adapted on the basis of the yaw rate deviation, which in the case in question is effected exclusively by a change in the longitudinal movement (adaptation of the speed), so that an effective reaction can be made to understeer or oversteer, for example.

Additionally or alternatively, an intervention in the lateral movement of the vehicle can also be made in that, if the deviation limit value is exceeded, on the basis of the yaw rate deviation as a stability variable
 a second braking stability variable for wheel-specific braking of the vehicle and/or
 a first steering stability variable for steering the vehicle
 is generated and output in such a way that, during automated control of the vehicle on the basis of the second braking stability variable and/or the first steering stability variable, the actual yaw rate moves closer to the setpoint yaw rate. In this way, the yaw movement, which can or could lead to instability, is counteracted in a targeted manner without necessarily also changing a longitudinal movement of the vehicle.

Preferably, it can also be provided in all cases that the first drive stability variable and/or the first braking stability variable and/or the second braking stability variable and/or the first steering stability variable are generated on the basis of a yaw rate deviation change in addition to or as an alternative to the yaw rate deviation, wherein the yaw rate deviation change indicates how the yaw rate deviation changes from the current time. This allows the changes in motion control to also be included in order to be able to react adequately to special driving states.

Preferably, it is further provided that a second steering stability variable is generated and output for preventing an undesirable driving state, wherein the second steering stability variable is generated on the basis of
 the actual speed of the vehicle and/or a setpoint curve radius derived from the setpoint trajectory, and/or
 a braking yaw moment, wherein the braking yaw moment is ascertained on the basis of wheel slip, acting differently at the sides, of wheels of the vehicle, and/or
 a tilt angle of the vehicle with respect to the roadway, taking into account a current vehicle mass.

Advantageously, this allows the current vehicle dynamics to be monitored even more precisely, in particular with regard to the vehicle's self-steering behavior, µ-split braking in the case of different friction values of the ground at the sides, and the vehicle's tilt behavior, all of which have an influence on the movement of the vehicle in the lateral direction. Accordingly, a countersteering can be engaged in a stabilizing manner on the basis of the steering stability variable in order to keep the vehicle stable on the specified setpoint trajectory. The necessary parameters (setpoint curve radius, wheel slip, tilt angle) are available to the system via the interfaces in the vehicle, since they are already detected and output as part of other stability control systems in the vehicle. Therefore, no additional components are required.

Preferably, the presence of an undesirable driving state is furthermore ascertained if a lateral acceleration of the vehicle at the current time and/or for a future time exceeds a limit lateral acceleration, wherein the lateral acceleration at the current time is measured and/or for the future time is estimated from the specified setpoint trajectory on the basis of the geometric trajectory variables. This means that the method can also be used to react to such stability-critical situations in the lateral direction with appropriate intervention in the vehicle dynamics.

Preferably, if the limit lateral acceleration is exceeded at the current time and/or for a future time, a second drive stability variable and/or a third braking stability variable is generated and output as a stability variable in such a way that, in the case of automated control of the vehicle, the lateral acceleration of the vehicle falls to or below the limit lateral acceleration on the basis of the third braking stability variable and/or the second drive stability variable. In this way, the longitudinal movement of the vehicle is adapted in a targeted manner in order to avoid excessive lateral acceleration.

Preferably, it is also provided that the setpoint trajectory is adapted on the basis of a stability indicator, wherein the stability indicator indicates, on the basis of a current vehicle actual dynamic and the current setpoint trajectory, how probable an undesirable driving state is at a point in time between the current time and a future point in time. Advantageously, the undesirable driving state is thus quantitatively evaluated by a characteristic variable so that the setpoint trajectory can be adapted in such a way that this undesirable driving state can be avoided as far as possible when the adapted setpoint trajectory is followed, and further corrective interventions on the basis of the stability variables can be omitted or at least reduced to a minimum.

Preferably, the stability indicator is formed depending on at least one feature selected from the group consisting of:
an articulation angle deviation between a current actual articulation angle and a setpoint articulation angle, a yaw rate deviation between an actual yaw rate and a setpoint yaw rate, the exceeding of a limit lateral acceleration, a wheel slip of the individual wheels of the vehicle, the presence of an ABS intervention, the presence of an ESC intervention and/or load information. All of these parameters and, if necessary, other parameters available in the vehicle can be used for a quantitative evaluation of the undesirable driving state.

According to an embodiment of the invention, a travel control unit is further provided, which is designed for carrying out the method according to an embodiment of the invention, wherein the travel control unit at least comprises:
a VD unit for defining a setpoint trajectory, wherein the setpoint trajectory is characterized by geometric trajectory variables, and for outputting an actual deviation if the vehicle deviates from the setpoint trajectory,
a first motion control unit, wherein the first motion control unit is designed to generate manipulated variables on the basis of the actual deviation in such a way that, in the case of automated control of a drive system and/or a braking system and/or a steering system of the vehicle, the vehicle moves closer to the setpoint trajectory on the basis of the generated manipulated variables if the vehicle deviates from the setpoint trajectory,
a second motion control unit, wherein the second motion control unit is designed to ascertain whether an undesirable driving state is present at a current time and/or for a future time when the vehicle moves closer to the setpoint trajectory on the basis of the generated manipulated variables, wherein the undesirable driving state can be ascertained from the specified setpoint trajectory on the basis of the geometric trajectory variables, wherein
furthermore at least one logic unit is provided, wherein the at least one logic unit is designed to generate and output a logic signal for the automated control of the drive system and/or the braking system and/or the steering system of the vehicle, wherein the logic signal can be generated and output as a function of generated stability variables in the presence of an undesirable driving state, and/or
the VD unit is designed to adapt the setpoint trajectory if an undesirable driving state is present.

According to an embodiment of the invention, therefore, a retrofittable journey control unit is described that can be easily integrated into the existing infrastructure in a vehicle, for example by connecting to the existing interfaces in the vehicle, for example a CAN data bus. The journey control unit can, for example, be part of an electronic braking system in which individual variables are already ascertained and also used. This makes it easy to retrofit.

The first and/or the second motion control unit can also be integrated here in the VD unit in which the setpoint trajectory is specified. It is also possible to combine the first motion control unit and the second motion control unit. However, in order to achieve full flexibility, it is advantageous to provide both control units separately from each other, such that, for example, only the second motion control unit, which can be used to detect an undesirable driving state and with the aid of which this undesirable driving state can be reacted to accordingly, may be added by the vehicle manufacturer to an existing first motion control unit. The function of the first motion control unit, which is used for stable driving, can therefore be extended by simply retrofitting the second motion control unit. It must be connected for this purpose to the corresponding existing interfaces in the vehicle.

Preferably, it is also provided that the drive system and/or the braking system and/or the steering system are each assigned a logic unit, wherein the drive system can be automatically controlled with a drive logic signal, the braking system with a braking logic signal, and the steering system with a steering logic signal. The logic signal in question can be ascertained here via a system logic in the corresponding logic unit in order to control the vehicle accordingly on the basis of the stability variables in the event of an undesirable driving state, i.e. exclusively with the generated stability variables, or the manipulated variables being adapted on the basis of the generated stability variables. In this way, a high degree of flexibility can be achieved, since the system logic can be used to decide individually for each lateral or longitudinal control component how to react to an instability or how the vehicle should move in relation to the setpoint trajectory.

Preferably, it is further provided that the second motion control unit comprises a yaw rate controller, wherein the yaw rate controller is designed to infer the presence of an undesirable driving state on the basis of an ascertained yaw rate deviation and to react by ascertaining and outputting a corresponding stability variable. Furthermore, the second motion control unit can comprise an RSC unit, wherein the RSC unit is designed to infer the presence of an undesirable driving state on the basis of an exceeding of the limit lateral acceleration and to react by ascertaining and outputting a corresponding stability variable.

In addition, the second motion control unit can have a stabilization monitor, wherein the stabilization monitor is designed to form a stability indicator on the basis of a current actual vehicle dynamic and the current setpoint trajectory, wherein the stability indicator indicates, on the basis of time, how likely an undesirable driving state is at a time between the current time and the future time. This allows a quantitative assessment of the undesirable driving state, which the VD unit can use to adapt the setpoint trajectory.

According to an embodiment of the invention, a vehicle with a journey control unit according to an embodiment of the invention is further provided for the automated guidance of the vehicle along a specified setpoint trajectory or an adapted setpoint trajectory.

Figure 2:
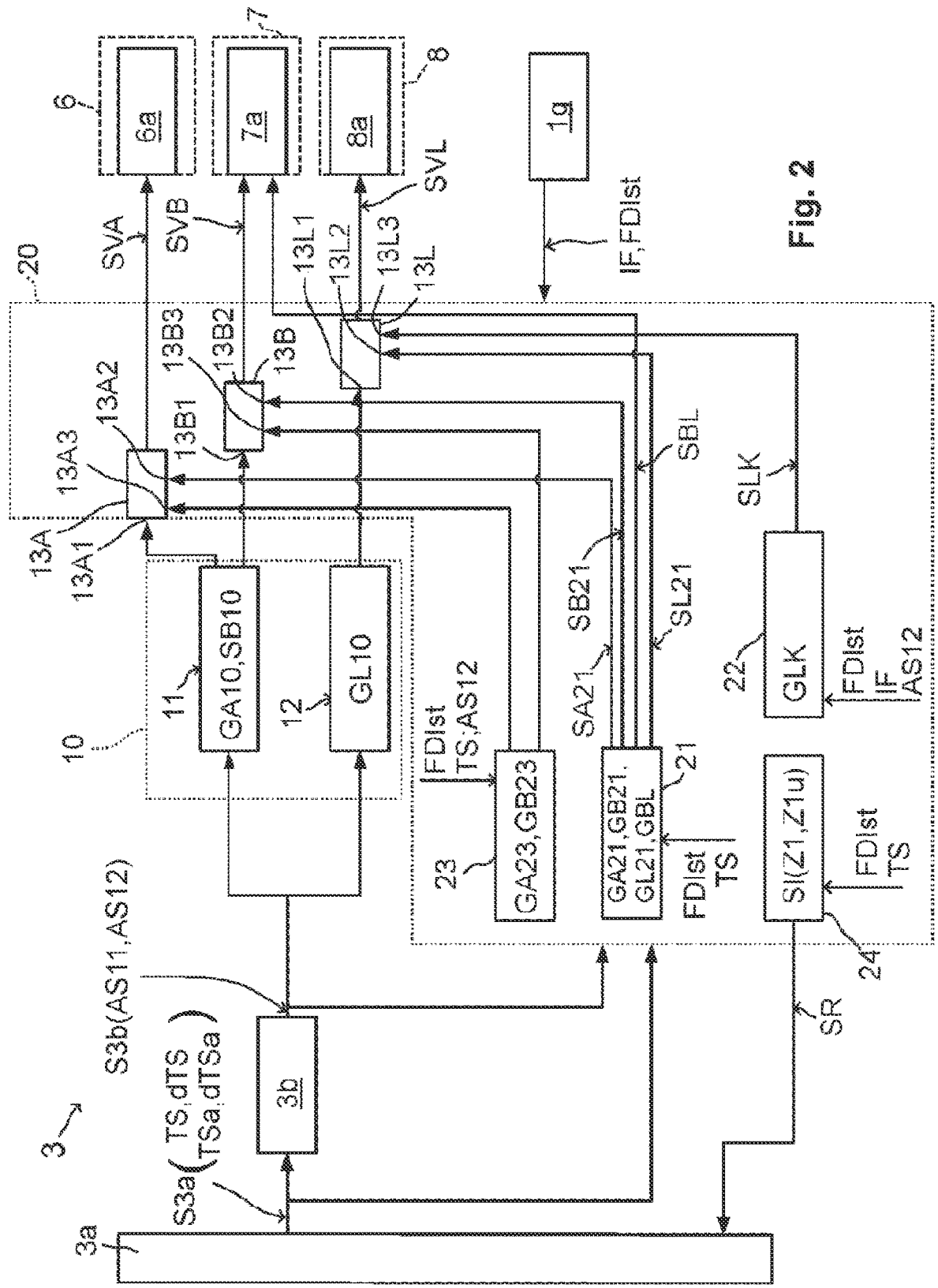
FIG. 2 illustrates a detailed view of the vehicle according to FIG. 1.
Figure 3:
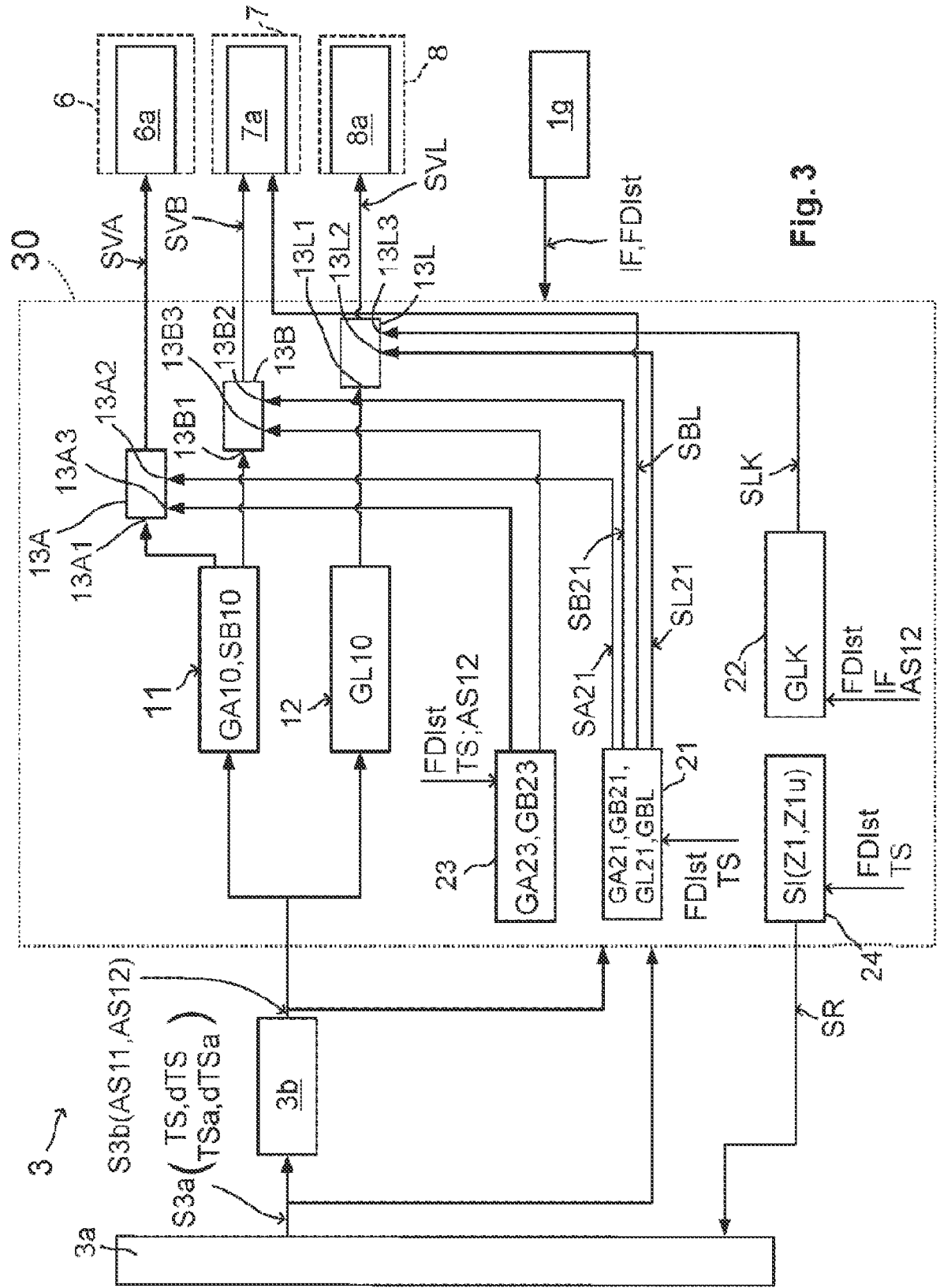
FIG. 3 illustrates a detailed view of an embodiment of the vehicle according to FIG. 1.

FIG. 1 schematically shows a vehicle 1 moving on a roadway 2. The vehicle 1 can be single-part or multi-part, i.e. consisting of a towing vehicle 1a and a trailer 1b, for example a commercial vehicle or a bus. The vehicle 1 can be controlled in an automated manner with the aid of a travel control device 3, wherein automation levels according to SAE level 3 to 5 are provided. Two journey control devices 3 are shown by way of example in FIGS. 2 and 3.

The journey control device 3 therefore has a VD unit 3a (Virtual Driver) in which, on the basis of criteria, for example a detected road course or the current surroundings U around the vehicle 1, there is defined a setpoint trajectory TS along which the vehicle 1 is to move automatically in the future. The setpoint trajectory TS is a future path here that is to be followed by automated control of a drive system 6 and/or a braking system 7 and/or a steering system 8 in the vehicle 1. The setpoint trajectory TS is characterized here by kinematic trajectory variables kG, so that the planned movement of the vehicle 1 or the future path is described exclusively geometrically, i.e. there is a geometrically described setpoint trajectory TS.

Figure 1A:
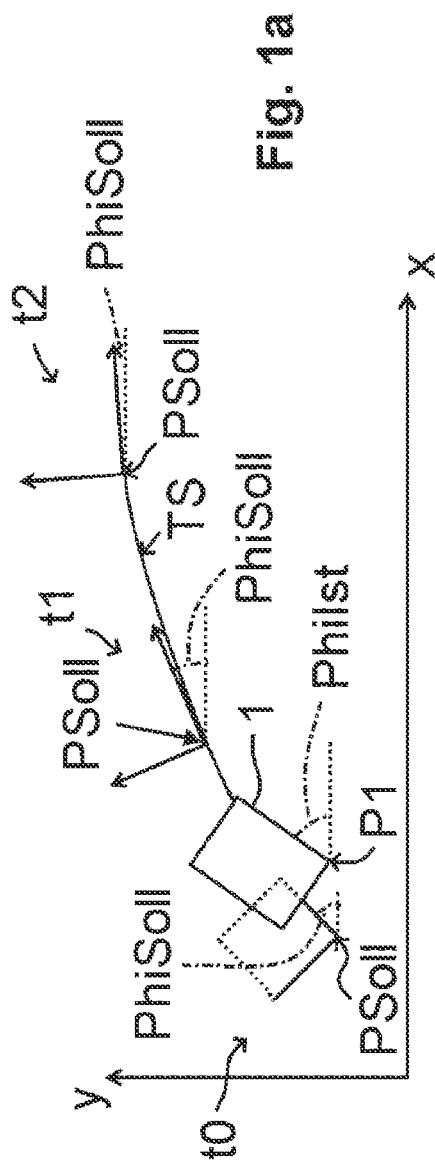
FIG. 1a illustrates an exemplary setpoint trajectory.

According to FIG. 1a, kinematic trajectory variables kG can be, for example, setpoint positions PSoll (required position), which are described by x-coordinates x and y-coordinates y of a preferably Cartesian coordinate system, as well as a setpoint rotation PhiSoll of the vehicle 1 at the respective times t0, t1, t2. The setpoint rotation PhiSoll indicates here how the vehicle 1 is oriented at the particular setpoint position PSoll. The setpoint position PSoll as well as the setpoint rotation PhiSoll can be described here relatively, i.e., in relation to the previous state, or absolutely, i.e., in relation to a starting point.

Figure 4:
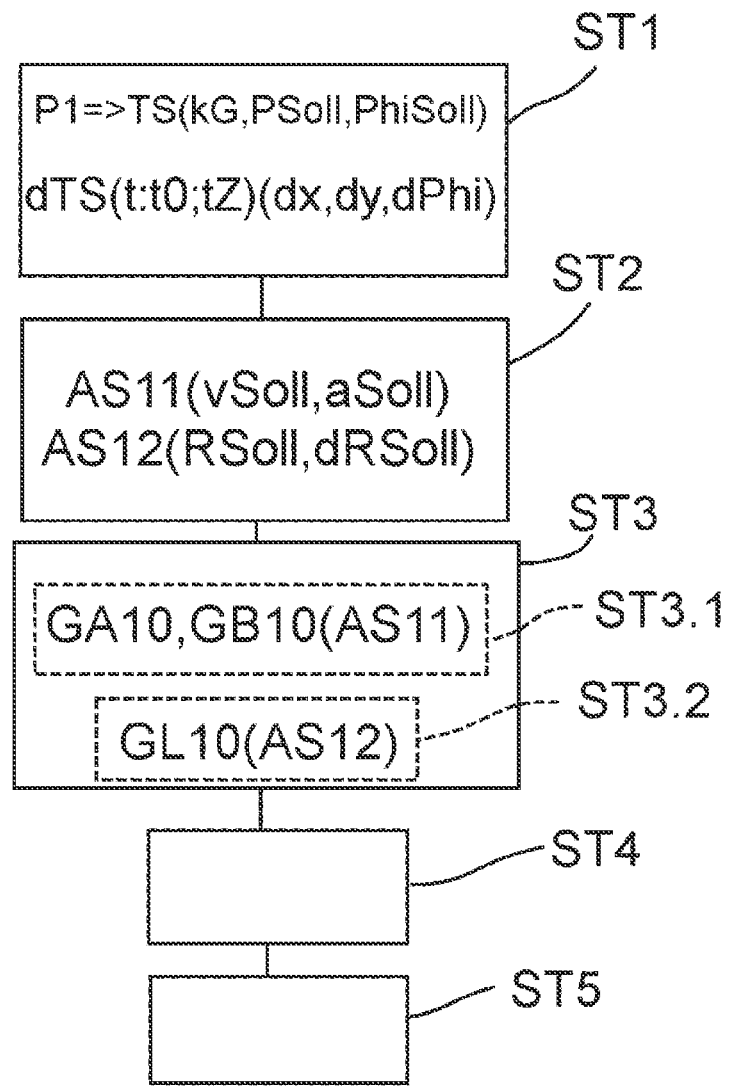
FIG. 4 and FIG. 5 show flow diagrams of a method according to an embodiment of the invention.

Via the travel control device 3, the method shown as an example in FIG. 4 can be carried out as follows:

The VD unit 3a first evaluates sensor signals S4 from sensors 4 of a surroundings acquisition system 5 to ascertain in a first step ST1 whether the vehicle 1 is actually moving along the geometrically defined setpoint trajectory TS. For this purpose, an actual deviation dTS between the vehicle 1 and the setpoint trajectory TS, i.e., a deviation between the current position P1 and an actual rotation PhiIst of the vehicle 1 from the geometric trajectory variables kG (PSoll, PhiSoll) defined in the setpoint trajectory TS, is determined. The actual deviation dTS can therefore be described geometrically by an x-deviation dx in the x-direction, a y-deviation dy in the y-direction (deviation between P1 and PSoll) and a rotational deviation dPhi. From this actual deviation dTS, it can be concluded which change in motion is necessary or how the vehicle 1 is to be controlled so that it moves along the geometric setpoint trajectory TS again in the future.

Both the setpoint trajectory TS and the actual deviation dTS (or related variables) are output from the VD unit 3a in a trajectory signal S3a. The trajectory signal S3a is output to both a specification unit 3b (motion control) and a second motion control unit 20, the function of which will be explained in more detail later. The output can also be separate signals in the same way.

Based on the actual deviation dTS, in a second step ST2 a setpoint speed vSoll and/or a setpoint acceleration aSoll (positive or negative) as longitudinal setpoint requirements AS11, which relate to the future desired longitudinal movement of the vehicle 1, and a setpoint curve radius RSoll or a setpoint curve radius change dRSoll as lateral setpoint requirements AS12, which relate to the future desired lateral movement of the vehicle 1, are ascertained in the specification unit 3b, for example. The ascertainment follows in such a way that, when the drive system 6 and/or the braking system 7 and/or the steering system 8 are controlled, the vehicle 1 again moves closer to the defined setpoint trajectory TS (i.e. the setpoint position PSoll and the setpoint rotation PhiSoll) on the basis of these setpoint requirements AS11, AS12. The setpoint requirements AS11, AS12 are output via a specification signal S3b.

The setpoint requirements AS11, AS12, which characterize the future desired movement of the vehicle 1, are then transmitted to a first motion control unit 10 and also to the second motion control unit 20 in a third step ST3. According to the implementation in FIG. 2, the first motion control unit 10 and the second motion control unit 20 are separated from each other. The second motion control unit 20 can therefore be designed and operated completely independently of the first motion control unit 10, so that the system can be variably retrofitted and extended. According to the embodiment of FIG. 3, however, both control units 10, 20 can also be combined in an overall motion control unit 30.

The first motion control unit 10 is divided into a longitudinal controller 11 and a lateral controller 12. The longitudinal setpoint requirements AS11 affecting the longitudinal movement of the vehicle 1 are processed in the longitudinal controller 11 and the lateral setpoint requirements AS12 affecting the lateral movement of the vehicle 1 are processed in the lateral controller 12. Similarly, it can be provided that the specification unit 3b is integrated in the first motion controller 10 and the corresponding setpoint requirements AS11, AS12 are output directly to the relevant controller 11, 12 and in a further signal to the second motion control unit 20.

In a first sub-step ST3.1, the longitudinal controller 11 ascertains a drive manipulated variable GA10, for example a drive force or a related variable, and a braking manipulated variable GB10, for example a braking force or a related variable, on the basis of the longitudinal setpoint requirements AS11. The drive manipulated variable GA10 and the braking manipulated variable GB10 specify manipulated variables with which the relevant actuators in the vehicle 1, preferably the drive motor, service brakes, sustained-action brakes, etc., are to be controlled in order to implement the longitudinal setpoint requirement AS11.

In addition, in a second sub-step ST3.2, a steering manipulated variable GL10, for example a steering angle or a related variable, is ascertained by the lateral controller 12 on the basis of the lateral setpoint requirements AS12. The steering manipulated variable GL10 specifies a manipulated variable with which the relevant actuator of the vehicle 1, preferably a servomotor of the steering system 8, is to be controlled in order to implement the lateral component of the setpoint requirements AS12.

The manipulated variables GA10, GB10, GL10 ascertained in this way are output in a fourth step ST4 via a first drive control signal SA10 or a first braking control signal SB10 or a first steering control signal SL10. The first drive control signal SA10 is transmitted to a first input 13A1 of a drive logic unit 13A, the first braking control signal SB10 is transmitted to a first input 13B1 of a braking logic unit 13B, and the first steering control signal SL10 is transmitted to a first input 13L1 of a steering logic unit 13L.

The particular logic unit 13A, 13B, 13L is capable of outputting a logic signal SVA, SVB, SVL depending on the signals present at its inputs 13A1, 13A2, 13A3, 13B1, 13B2, 13B3, 13L1, 13L2, 13L3. Depending on the particular logic signal SVA, SVB, SVL, a drive control unit 6a of the drive system 6 or a braking control unit 7a of the braking system 7, or a steering control unit 8a of the steering system 8 is subsequently controlled. How the logic signal SVA, SVB, SVL is ascertained in the corresponding logic unit 13A, 13B, 13L depends on the control logic stored therein.

If, in a fifth step ST5, the particular logic unit 13A, 13B, 13L transmits the first drive control signal SA10 or the first braking control signal SB10 or the first steering control signal SL10 as logic signals SVA, SVB, SVL to the corresponding control unit 6a, 7a, 8a on the basis of the control logic implemented therein, these can control the corresponding actuators of the drive system 6, i.e., for example, the drive motor of the vehicle 1, or of the braking system 7, i.e., for example, the service brakes and/or the sustained-action brakes, or of the steering system 8, i.e., a servomotor, accordingly. In this way, the setpoint requirements AS11, AS12, which were issued on the basis of the detected actual deviation dTS, can be implemented in order to bring the position P1 of the vehicle 1 and the actual rotation PhiIst closer to the setpoint trajectory TS in the future.

In order to ensure stable driving even with such automated control of the vehicle 1 via the first motion control unit 10, the second motion control unit 20 is provided, which preferably only intervenes if undesirable driving states $Z1u$, e.g. stability-critical driving states, are already present at the current time t0 or if these are highly likely to occur in a specified time period dt between the current time t0 and a future time tZ. To achieve this, the second motion control unit 20 is designed to evaluate the state of the vehicle 1 with regard to its stability on the basis of the setpoint trajectory TS specified via the trajectory signal S3a and the setpoint requirements AS11, AS12 output via the specification signal S3b and additionally on the basis of vehicle information IF (vehicle model) and a vehicle actual dynamic FDIst (ego motion) and to specifically influence the motion of the vehicle 1 on the basis thereof.

For this purpose, the second motion control unit 20 determines a driving state Z1 in several stabilization steps, depending on which the manipulated variables GA10, GB10, GL10 resulting from the setpoint requirements AS11, AS12 are adapted. The driving state Z1 can, for example, be an undesirable driving state $Z1u$ in which the vehicle 1 is unstable at the current time t0 and/or instability is imminent in the future within the specified time period dt.

Figure 5:
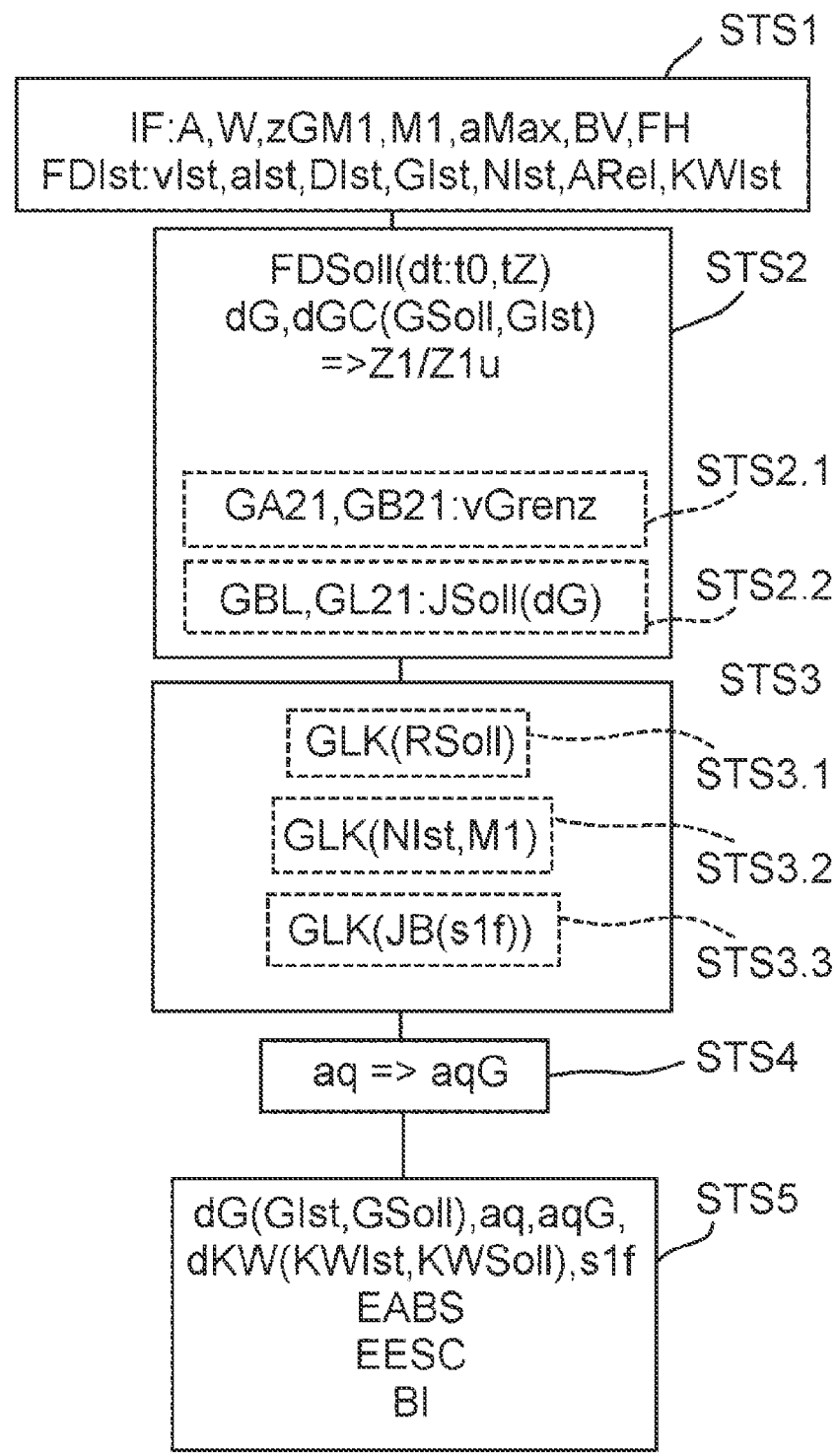

The second motion control unit 20 carries out the method steps described below (see FIG. 5) continuously and in parallel with the method steps according to FIG. 4, which are carried out by the first motion control unit 10. As a result, the second motion control unit 20 is able to specifically adapt the above-described control of the vehicle 1 by the first motion control unit 10 if an undesirable driving state $Z1u$ is present. The second motion control unit 20 has access here to any interfaces in the vehicle 1, so that the second motion control unit 20 can read in vehicle information IF and/or the vehicle actual dynamics FDIst in a first stabilization step STS1.

Here, vehicle information IF is understood to be information about the vehicle 1 that does not relate to the vehicle dynamics, but to the vehicle 1 itself. This includes configured vehicle parameters such as a wheelbase A, a track width W or a permissible total mass zGM1 of the vehicle 1, etc., but also vehicle parameters that can change during operation, e.g. a current total mass M1 of the vehicle 1, a maximum acceleration capacity aMax (positive or negative) or a brake pad wear BV, etc., which are measured, estimated or observed during operation. Furthermore, information as to whether the vehicle 1 has a hitched trailer 1b can also be processed, or a vehicle height FH of the vehicle 1.

The vehicle actual dynamics FDIst is understood to be, among other things, the longitudinal movement of the vehicle 1 parallel to the direction of travel FR, which can be described, for example, by an actual speed vIst, an actual acceleration aIst, an actual distance DIst to an object in the direction of travel FR, etc. The vehicle actual dynamics FDIst, however, can also be specified by variables describing the orientation of the vehicle 1, for example by an actual yaw rate GIst, a tilt angle NIst with respect to the roadway 2, or a relative orientation ARel of the vehicle 1 with respect to the direction of travel FR, or an actual articulation angle KWIst between a towing vehicle 1a and trailer 1b. Therefore, both the position and the orientation (pose) of the vehicle 1 in six degrees of freedom as well as their change via the respective derivatives can be ascertained from the vehicle actual dynamics FDIst.

The vehicle actual dynamics FDIst can be ascertained here from sensor signals that measure or characterize a movement of the vehicle 1, for example by wheel speed signals S1c from wheel speed sensors 1c on wheels 1f in the vehicle 1, acceleration signals S1d from acceleration sensors 1d (measuring transversely and longitudinally) in the vehicle 1, and yaw rate signals S1e from a yaw rate sensor 1e in the vehicle 1. These sensors 1c, 1d, 1e are here sensors that are already present in a braking system 7 that operates (partially) electrically, e.g. an EBS (electronic braking system), so that they can be accessed via a corresponding interface 1g, e.g. a CAN interface. In addition, however, further sensors can also be provided in the vehicle 1, via which, for example, a low actual speed vIst, the direction of travel FR, or the actual articulation angle KWIst between a towing vehicle 1a and trailer 1b can be ascertained, so that this information relating to the vehicle actual dynamics FDIst can also be accessed. The sensor signals of the individual sensors can also be fused here in order to achieve a higher accuracy and/or to check their plausibility.

Depending on the vehicle information IF and/or the vehicle actual dynamics FDIst, the second motion control unit 20 can evaluate, in a plurality of stabilization steps, whether, in the presence of an actual deviation dTS for the specified setpoint trajectory TS, an implementation of the setpoint requirements AS11, AS12 output by the specification unit 3b leads or would lead to instabilities, or whether an undesirable driving state $Z1u$ results or would result therefrom, and can respond accordingly.

For this purpose, a yaw rate monitoring is performed in the second motion control unit 20 in a second stabilization step STS2 via a yaw rate controller 21. The yaw rate controller 21 is designed here to analyze the setpoint trajectory TS output by the VD unit 3$a$ in order to calculate therefrom a setpoint driving dynamic FDSoll for the current time t0 and also for time points t within the specified time period dt up to the future time tZ, for example up to t0+10 s. The yaw rate controller 21 makes use here of the geometric trajectory variables kG, which characterize the future travel path or the setpoint trajectory TS, to estimate the setpoint driving dynamics FDSoll. Therefore, no requirements on the systems 6, 7, 8 in the vehicle 1 are evaluated, but directly the setpoint trajectory TS specified by the "Virtual Driver" (VD unit 3$a$).

For this purpose, a setpoint yaw rate GSoll can be ascertained from the geometric information (PSoll, PhiSoll) in the setpoint trajectory TS, in particular for the current time t0, e.g. via the single-track model. This setpoint yaw rate GSoll can be compared with the currently present actual yaw rate GIst, which follows from the transmitted vehicle actual dynamics FDIst, for example by determining a yaw rate deviation dG between the actual yaw rate GIst and the setpoint yaw rate GSoll. The driving state Z1 can then be derived on the basis of the yaw rate deviation dG.

It can be provided here that an undesirable driving state Z1$u$ is output immediately for any yaw rate deviations dG other than zero (cf. dGW=0). However, it is also possible to allow a certain deviation from the setpoint yaw rate GSoll and to output an undesirable driving state Z1$u$ only if, for example, the yaw rate deviation dG exceeds a defined deviation limit value dGW.

Additionally or alternatively, the setpoint requirements AS11, AS12 output by the specification unit 3$b$, which are formed on the basis of the geometric setpoint trajectory TS, can also be taken into account in order to take into account the subsequently requested driving state of the vehicle 1 when determining the setpoint yaw rate GSoll.

On the basis of the derived driving state Z1 and thus the yaw rate deviation dG, the actual vehicle speed vIst can then be limited to a limit speed vGrenz in a first sub-step STS2.1. For this purpose, a first drive stabilization signal SA21 with a first drive stability variable GA21, for example a drive force limit, can be output from the yaw rate controller 21 to the second input 13A2 of the drive logic unit 13A. Based on this, a drive logic signal SVA is output from the drive logic unit 13A and is used to prevent the vehicle 1 from exceeding a specified limit speed vGrenz linked to the drive force limit when the drive motor is controlled as an actuator of the drive system 6. Thus, the drive manipulated variable GA10 at the first input 13A1 of the drive logic unit 13A is adapted in the presence of an undesirable driving state Z1$u$.

If the limit speed vGrenz is already exceeded, a first braking stabilization signal SB21 with a first braking stability variable GB21, for example a braking force, is output from the yaw rate controller 21 to the second input 13B2 of the braking logic unit 13B. Based on this, a braking logic signal SVB is output by the braking logic unit 13B and is used to brake the vehicle 1 when the brakes and/or the sustained-action brakes are controlled as actuators of the braking system 7 in such a way that the vehicle 1 reaches or at least does not exceed the specified limit speed vGrenz. In this way, the braking manipulated variable GB10, which results from the longitudinal setpoint requirement AS11, is specifically adapted on the basis of the driving state Z1 or the undesirable driving state Z1$u$.

In a second sub-step STS2.2, a setpoint yaw moment JSoll can be specified alternatively or additionally on the basis of the driving state Z1 and can compensate for the yaw rate deviation dG. This setpoint yaw moment JSoll can be implemented, for example, by controlling the braking system 7 wheel-specifically in order to achieve steering braking. For this purpose, a second braking stabilization signal SBL with a second braking stability variable GBL, e.g. wheel-specific braking forces, can be output by the yaw rate controller 21 to the braking control device 7$a$ of the braking system 7, which takes over this wheel-specific control of the brakes in order to thus compensate for the yaw rate deviation dG. In this way, too, the braking manipulated variable GB10, which results from the longitudinal setpoint requirement AS11, is specifically adapted on the basis of the driving state Z1 or the undesirable driving state Z1$u$, since this results in a different braking force distribution to the individual wheels and, if necessary, also an adapted total braking force.

Alternatively or additionally, the setpoint yaw moment JSoll can also be implemented by controlling the steering system 8 to effect a countersteering. In this way, it can be taken into account that the braking force for steering braking cannot be increased indefinitely at individual wheels via the second braking stabilization signal SBL or the second braking stability variable GBL, and that each reduction in the braking force at individual wheels results in a reduced overall braking force and thus an increased braking distance. In order to achieve such independent or at least assisting countersteering by the steering system 8, a first steering stabilization signal SL21 is generated by the yaw rate controller 21 with a first steering stability variable GL21, for example a steering angle with which the setpoint yaw moment JSoll can be effected fully or at least proportionally (in the case of a combination with steering braking).

This first steering stabilization signal SL21 is then output to the second input 13L2 of the steering logic unit 13L. Based on this, a steering logic signal SVL is output by the steering logic unit 13L and is used to steer the vehicle 1 when the steering system 8 is controlled, for example via a servomotor as actuator of the steering system 8, in such a way that the setpoint yaw moment JSoll is fully or at least partially achieved. Depending on the driving situation, the first steering stabilization signal SL21 can be superimposed at least proportionally on an already existing steering (steering control signal SL10) by the steering logic unit 13L. In this way, too, the steering manipulated variable GL10, which results from the lateral setpoint requirement AS11, is specifically adapted on the basis of the driving state Z1 or the undesirable driving state Z1$u$.

The described monitoring of the yaw rate deviation dG can also be extended to other points in time t within the defined period between t0 and dt. The geometrically described setpoint trajectory TS can be used to predict how the actual yaw rate GIst will behave in the future relative to the setpoint yaw rate GSoll, which is derived from the setpoint trajectory TS, and how the yaw rate deviation dG will change over time. For example, by analyzing a yaw rate deviation change dGC, an incipient understeer or oversteer or a maintenance of the setpoint trajectory TS but only with a sharply increasing steering angle can be detected. The geometric setpoint trajectory TS can therefore be used to predict whether, with regard to the yaw behavior of the vehicle 1, an undesirable driving state Z1$u$ is very likely to occur if, for example, the setpoint curve radius RSoll of the setpoint trajectory TS decreases further, or whether an undesirable driving state Z1$u$ can be avoided if the setpoint curve radius RSoll increases again. The stabilization steps STS2, STS2.1, STS2.2 can also be used to react adequately to this.

In a third stabilization step STS3, a steering angle correction can be performed, which takes place in a correction unit 22. In the case of low actual speeds vIst of the vehicle 1 and stable driving on roadways 2 with a high friction value, the steering manipulated variable GL10, which is instructed via the lateral setpoint requirement AS12, follows mainly from the vehicle geometry, i.e. for example the wheelbase A, the track width W, the actual articulation angle KWIst, etc., taking into account minor corrections. However, if more complex dynamics or higher actual speeds vIst and/or a roadway 2 with low friction values are present, further corrections are necessary. The driving state Z1 without these further corrections can therefore be evaluated as an undesirable driving state Z1u, so that the following corrections are made by the correction unit 22:

In one variant (STS3.1), the self-steering behavior of the vehicle 1 can be taken into account according to a "linear bicycle model", wherein the correction unit 22, via a second steering stabilization signal SLK, outputs a second steering stability variable GLK, for example a steering angle, which is transmitted to a third input 13L3 of the steering logic unit 13L. The second steering stability variable GLK is ascertained on the basis of the current vehicle actual dynamics FDIst and also on the basis of the vehicle information IF, which can be used to determine via the "linear bicycle model" how the steering angle or the steering manipulated variable GL10 is to be adapted on the basis of the actual speed vIst of the vehicle 1 and/or the setpoint curve radius RSoll derived from the setpoint trajectory TS, in order to prevent or stop an undesirable driving state Z1u. In this case, the setpoint curve radius RSoll preferably follows from the lateral setpoint requirement AS12, which is also transmitted to the second motion control unit 20 and is ascertained by the specification unit 3b. Via the steering logic unit 13L, the lateral setpoint requirement AS12 or the steering manipulated variable GL10 can be adapted in a corresponding manner via a control logic implemented therein on the basis of the second steering stability variable GLK, whereupon a corresponding steering logic signal SVL is output.

Furthermore, in the correction unit 22, the behavior of the vehicle 1 on a friction coefficient split roadway 2 (µ-split) can be ascertained (STS3.2) on the basis of the vehicle actual dynamics FDIst via a dynamic model, which can lead to an undesirable driving state Z1u due to an acting braking yaw moment JB. For this purpose, for example, wheel slip s1f of wheels 1f of the vehicle 1 can be used, said wheel slip being ascertained via the wheel speed signals S1c of the wheel speed sensors 1c. From these, an actual yaw rate GIst of the vehicle 1 can be ascertained and this can be compared with the setpoint yaw rate GSoll resulting from the setpoint trajectory TS or the lateral setpoint demand AS12. From the yaw rate deviation dG resulting therefrom, a second steering stability variable GLK can also be ascertained by the correction unit 22 and describes which braking yaw moment JB is to be compensated by a steering system due to braking on the friction coefficient split roadway 2 in order to continue to ensure stable driving and to remedy the undesirable driving state Z1u. If the steering manipulated variable GL10 is corrected or adapted with this second steering stability variable GLK in the steering logic unit 13L, such a braking yaw moment JB can be compensated when the steering system 8 is controlled with a corresponding steering logic signal SVL.

The correction unit 22 can also take into account the tilt angle NIst of the vehicle 1 relative to the roadway 2 (STS3.3). A higher tilt angle NIst must be compensated here by the steering system in order to maintain a stable driving state or to avoid an undesirable driving state Z1u. For this purpose, a model can be assumed in the correction unit 22 in which the tilt of the vehicle 1 or the tilt angle NIst and the current vehicle mass M1 are used to determine the second steering stability variable GLK. If the steering manipulated variable GL10 is corrected with this second steering stability variable GLK in the steering logic unit 13L, a tilt correction can take place when the steering system 8 is controlled with a corresponding steering logic signal SVL.

In addition to the described corrections, further corrections by the correction unit 22 are also possible in order to react to undesirable driving states Z1u.

In addition to the yaw rate controller 21 and the correction unit 22, the second motion control unit 20 also includes an RSC unit 23 (RSC, Roll Stability Control), which can be used in a fourth stabilization step STS4 to prevent the vehicle 1 from tipping over as an undesirable driving state Z1u. The RSC unit 23 monitors in particular a lateral acceleration aq of the vehicle 1 at the current time t0, which follows, for example, from the acceleration signals S1d of the acceleration sensors 1d.

If the lateral acceleration aq exceeds a limit lateral acceleration aqG, the RSC unit 23 concludes that an undesirable driving state Z1u has occurred and thereupon outputs a second drive stability variable GA23, for example a drive force limit, and/or a third braking stability variable GB23, for example a braking force, which is output via corresponding signals SA23, SB23 to third inputs 13A3, 13B3 of the drive logic unit 13A and the braking logic unit 13B, respectively. A corresponding logic signal SVA, SVB is generated in the logic units 13A, 13B to appropriately control the drive system 6 and the braking system 7, respectively, and to decelerate the vehicle 1 so that the lateral acceleration aq falls back to or below the limit lateral acceleration aqG and the undesirable driving state Z1u is eliminated.

In addition, the RSC unit 23 can also access the geometric or kinematic trajectory variables kG of the future motion of the vehicle 1 via the setpoint trajectory TS in order to evaluate whether the lateral acceleration aq between the current time t0 and the future time tZ will exceed the limit lateral acceleration aqG if the vehicle 1 continues to move, for example, at the current actual speed vIst. The RSC unit 23 can then output the third braking stability variable GB23 and/or the second drive stability variable GA23 to the braking logic unit 13B and the drive logic unit 13A, respectively, even in advance, to prevent the exceeding of the limit lateral acceleration aqG from occurring. In this way, an undesirable driving state Z1u in the future can be ascertained and reacted to in advance.

In a fifth stabilization step STS5, provision can be made to generate a return signal SR in a stabilization monitor 24 and to transmit this to the VD unit 3a. The return signal SR is dependent here on the current and/or the future driving behavior or the current and/or the future driving state Z1 of the vehicle 1, which is continuously ascertained in the various units 21, 22, 23. The current or future driving state Z1 can therefore follow, for example, from:
- the yaw rate deviation dG as described for the second stabilization step STS2, and/or
- the imminent overturning of the vehicle 1 via the lateral acceleration aq, as described for the fourth stabilization step STS4, and/or an articulation angle deviation dKW between the current actual articulation angle KWIst and a setpoint articulation angle KWSoll, which can be estimated from the setpoint trajectory TS, and/or a wheel slip s1f of the individual wheels 1f of the vehicle 1 and/or the presence of an ABS intervention EABS or an ESC intervention EESC and/or of load information BI, e.g. axle load information or center of gravity information or vibration information of the load, etc. Also the change of individual of the above-mentioned values over time can be considered in the return signal SR.

The return signal SR may, for example, include a time-dependent stability indicator SI, which is ascertained by the stabilization monitor 24 based on the current vehicle actual dynamics FDIst as well as the setpoint trajectory TS and which therefore evaluates the current and/or the future driving state Z1 with the enumerated variables. For example, the stability indicator SI may be a value between 0% and 100% or 0 and 1 and may indicate a time-dependent probability of instability or an undesirable driving state Z1u at a certain time t between the current time t0 and the future time tZ.

The VD unit 3a can use this return signal SR or the stability indicator SI for an adaptation of the current setpoint trajectory TS or the trajectory variables kG (PSoll(x, y), PhiSoll). Based on the adapted setpoint trajectory TSa, which is then also described exclusively by geometric variables (PSoll(x, y), PhiSoll), the VD unit 3a can then determine and output an adapted actual deviation dTSa for the current time t0, which already takes into account the ascertained current and/or future driving state Z1. For the adapted setpoint trajectory TSa, the stability indicator SI then also changes accordingly. Based on the adapted actual deviation dTSa, setpoint requirements AS11, AS12 are then ascertained and output by the specification unit 3b, and take into account the current and/or future driving state Z1. In this way, the manipulated variables GA10, GB10, GL10 are adapted in advance on the basis of the ascertained driving state Z1.

Therefore, a stabilizing intervention by the second motion control unit 20 can be prevented by the second motion control unit 20 judging in advance, depending on the geometrically specified setpoint trajectory TS, whether an instability or an undesirable driving state Z1u would occur if this setpoint trajectory TS were to be maintained. The virtual driver, which is realized by the VD unit 3a, can adapt its planned driving behavior accordingly by selecting and outputting an adapted setpoint trajectory TSa. Thus, limit values above which instability is considered possible can be adapted for future driving, since a predictive assessment is made. In addition, further parameters can be included.

In the stabilization steps STS2, STS3, STS4, STS5, the movement of the vehicle 1 (manipulated variables GA10, GB10, GL10) originally specified by the first motion control unit 10 is thus adapted in situ or in anticipation on the basis of the driving state Z1 in order to prevent or avoid an undesirable driving state Z1u, e.g. a detected or imminent instability. The individual stabilization steps STS2, STS3, STS4, STS5 are executed here in parallel.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 Vehicle
1a Towing vehicle
1b Trailer
1c Wheel speed sensor
1d Acceleration sensor
1e Yaw rate sensor
1f Wheels of the vehicle 1
1g Interface, for example CAN interface
2 Roadway
3 Journey control device
3a VD unit (Virtual Driver)
3b Specification unit (motion control)
4 Sensor
5 Surroundings acquisition system
6 Drive system
6a Drive control unit
7 Braking system
7a Braking control unit
8 Steering system
8a Steering control unit
10 First motion control unit
11 Longitudinal controller
12 Lateral controller
13A Drive logic unit
13A1, 13A2, 13A3 Inputs of the drive logic unit
13B Braking logic unit
13B1, 13B2, 13B3 Inputs of the braking logic unit
13L Steering logic unit
13L1, 13L2, 13L3 Inputs of the steering logic unit
20 Second motion control unit
21 Yaw rate controller
22 Correction unit
23 RSC unit
24 Stabilization monitor
aIst Actual acceleration
aMax Maximum acceleration capacity
aq Lateral acceleration
aqG Limit lateral acceleration
aSoll Setpoint acceleration A Wheelbase
ARel Relative orientation of the vehicle 1
AS11 Longitudinal setpoint requirements
AS12 Lateral setpoint requirements
BI Loading information
BV Braking wear
dt Time period
dG Yaw rate deviation
dGC Yaw rate deviation change
dGW Deviation limit value
dPhi Rotation deviation
dKW Articulation angle deviation
dRSoll Setpoint curve radius change
dTS Actual deviation
dTSa Adapted actual deviation
DIst Actual distance
EABS ABS intervention
EESC ESC intervention
FDIst Vehicle actual dynamics
FDSoll Vehicle setpoint dynamics
FR Direction of travel
GA10 Drive manipulated variable
GA21 First drive stability variable
GA23 Second drive stability variable
GB10 Braking manipulated variable
GB21 First braking stability variable
GB23 Third braking stability variable
GBL Second braking stability variable
GIst Actual yaw rate
GSoll Setpoint yaw rate
GL10 Steering manipulated variable
GL21 First steering stability variable
GLK Second steering stability variable
IF Vehicle information
JB Braking yaw moment
JSoll Setpoint yaw moment
kG Trajectory variables
KWIst Actual articulation angle
KWSoll Setpoint articulation angle
M1 Current total mass of the vehicle 1
NIst Tilt angle
P1 Position of the vehicle 1
PhiIst Actual rotation of the vehicle 1
PhiSoll Setpoint rotation of the vehicle 1
PSoll Setpoint position of the vehicle 1
RSoll Setpoint curve radius
s1f Wheel slip
S1c Wheel speed signal
S1d Acceleration signal
S1e Yaw rate signal
S3a Trajectory signal
S3b Specification signal
S4 Sensor signal
SA10 Drive control signal
SA21 First drive stabilization signal
SA23 Second drive stabilization signal
SB10 Braking control signal
SB21 First braking stabilization signal
SB23 Third braking stabilization signal
SBL Second braking stabilization signal
SL10 Steering control signal
SL21 First steering stabilization signal
SLK Second steering stabilization signal
SI Stability indicator
SR Return signal
SVA Drive logic signal
SVB Braking logic signal
SVL Steering logic signal
t Time
t0 Current time
tZ Future time
TS Setpoint trajectory
TSa Adapted setpoint trajectory
U Surroundings
vIst Actual speed
vSoll Setpoint speed
W Track width
x x-coordinate
y y-coordinate
zGM1 Permissible total mass of the vehicle 1
Z1 Driving state
Z1u Undesirable driving state

The invention claimed is:

1. A method for automated guidance of a vehicle along a specified setpoint trajectory at an actual speed, wherein the setpoint trajectory includes geometric trajectory variables, the method comprising:
ascertaining an actual deviation of the vehicle from the setpoint trajectory;
outputting the ascertained actual deviation to at least one controller and generating manipulated variables in the at least one controller based on the ascertained actual deviation such that the vehicle, in the case of automated control of a drive system and/or a braking system and/or a steering system of the vehicle, moves closer to the setpoint trajectory based on the generated manipulated variables if the vehicle deviates from the setpoint trajectory,
ascertaining in the at least one controller whether an undesirable driving stability state is present for a future time when the vehicle moves closer to the setpoint trajectory based on the generated manipulated variables, wherein the undesirable driving stability state is ascertained from the specified setpoint trajectory based on the geometric trajectory variables; and
if the presence of the undesirable driving stability state is identified for a future time,
automatically controlling the vehicle based on stability variables generated in the at least one controller and/or adapting the setpoint trajectory.

2. The method as claimed in claim 1, wherein the ascertainment of whether the undesirable stability driving state is present for the future time is additionally carried out based on vehicle information about the vehicle and/or based on a vehicle actual dynamic of the vehicle and/or based on setpoint requirements for controlling the drive system and/or the braking system and/or the steering system.

3. The method as claimed in claim 2, wherein the setpoint requirements are ascertained based on the actual deviation, wherein
a position and/or actual rotation of the vehicle deviating from the setpoint trajectory in the direction of travel of the vehicle is corrected via longitudinal setpoint requirements, and
a position and/or actual rotation of the vehicle deviating perpendicularly to the direction of travel from the setpoint trajectory is corrected via lateral setpoint requirements.

4. The method as claimed in claim 3, wherein a drive manipulated variable and/or a braking manipulated variable and/or a steering manipulated variable are ascertained as manipulated variables based on the actual deviation, wherein each of:

the drive system of the vehicle based on the drive manipulated variable, the braking system of the vehicle based on the braking manipulated variable, and the steering system of the vehicle based on the steering manipulated variable can be automatically controlled to bring the position and/or actual rotation of the vehicle closer to the setpoint trajectory.

5. The method as claimed in claim 1, wherein the presence of the undesirable driving stability state is ascertained if it follows from the specified setpoint trajectory based on the geometric trajectory variables that the vehicle is unstable at the current time and/or an unstable state is imminent for a future time.

6. The method as claimed in claim 1, wherein the presence of the undesirable driving stability state is ascertained if a yaw rate deviation between a setpoint yaw rate and an actual yaw rate at the current time and/or for a future time exceeds a deviation limit value, wherein the setpoint yaw rate at the current time and/or for a future time follows indirectly or directly from the specified setpoint trajectory based on the geometric trajectory variables.

7. The method as claimed in claim 6, wherein, if the deviation limit value is exceeded based on the yaw rate deviation, then one of:
    a first drive stability variable for limiting the actual speed of the vehicle and/or
    a first braking stability variable for reducing the actual speed of the vehicle
    is generated and output as a stability variable such that, during automated control of the vehicle based on the first drive stability variable and/or the first braking stability variable, the actual speed of the vehicle does not exceed a specified limit speed.

8. The method as claimed in claim 7, wherein the first drive stability variable and/or the first braking stability variable and/or the second braking stability variable and/or the first steering stability variable are generated based on a yaw rate deviation change, wherein the yaw rate deviation change indicates how the yaw rate deviation changes from the current time.

9. The method as claimed in claim 6, wherein, if the deviation limit value is exceeded based on the yaw rate deviation, then one of:
    a second braking stability variable for wheel-specific braking of the vehicle and/or
    a first steering stability variable for steering the vehicle
    is generated and output as a stability variable such that, during automated control of the vehicle, the actual yaw rate moves closer to the setpoint yaw rate based on the second braking stability variable and/or the first steering stability variable.

10. The method as claimed in claim 1, wherein a second steering stability variable is generated and output for preventing an undesirable driving state, wherein the second steering stability variable is generated based on:
    the actual speed of the vehicle and/or a setpoint curve radius derived from the setpoint trajectory, and/or
    a braking yaw moment, wherein the braking yaw moment is ascertained based on wheel slip, acting differently at sides of wheels of the vehicle, and/or
    a tilt angle of the vehicle with respect to the roadway, taking into account a current vehicle mass.

11. The method as claimed in claim 1, wherein the presence of the undesirable driving stability state is ascertained if a lateral acceleration of the vehicle exceeds a limit lateral acceleration at the current time and/or for a future time.

12. The method as claimed in claim 11, wherein the lateral acceleration is measured at the current time and/or is estimated for the future time from the specified setpoint trajectory based on the geometric trajectory variables.

13. The method as claimed in claim 11, wherein, if the limit lateral acceleration is exceeded at the current time and/or for a future time, a second drive stability variable and/or a third braking stability variable is generated and output as a stability variable such that, in the case of automated control of the vehicle, based on the third braking stability variable and/or of the second drive stability variable, the lateral acceleration of the vehicle drops to or falls below the limit lateral acceleration.

14. The method as claimed in claim 1, wherein the setpoint trajectory is adapted based on a stability indicator, wherein the stability indicator indicates, based on a current vehicle actual dynamic and the current setpoint trajectory, in a time-dependent manner how probable the undesirable driving stability state is at a time between the current time and a future time.

15. The method as claimed in claim 14, wherein the stability indicator is determined depending on at least one feature selected from the group consisting of:
    an articulation angle deviation between a current actual articulation angle and a setpoint articulation angle, a yaw rate deviation between an actual yaw rate and a setpoint yaw rate, exceeding of a limit lateral acceleration, a wheel slip of one or more individual wheels of the vehicle, presence of an ABS intervention, presence of an ESC intervention and/or load information.

16. The method as claimed in claim 1, wherein the vehicle is automatically controlled based on generated stability variables such that the drive system and/or the braking system and/or the steering system of the vehicle
    is controlled exclusively with the generated stability variables, or
    the manipulated variables are adapted depending on the generated stability variables.

17. The method as claimed in claim 1, wherein the setpoint trajectory includes setpoint positions and setpoint rotations as geometric trajectory variables.

18. The method as claimed in claim 1, wherein
    the ascertainment of an actual deviation of the vehicle from the setpoint trajectory is carried out in a virtual driver;
    the generation of manipulated variables is carried out in a first motion controller of the at least one controllers based on the ascertained actual deviation; and
    the ascertainment of whether the undesirable driving stability state is present for the future time is carried out in a second motion controller of the at least one controllers, wherein
    the generation of the manipulated variables in the first motion controller is carried out independently of the ascertainment of the undesirable driving stability state in the second motion controller and/or
    the ascertainment of an actual deviation in the virtual driver is performed independently of the ascertainment of the undesirable driving stability state in the second motion controller.

19. A journey controller for carrying out the method as claimed in claim 1, wherein the journey controller comprises:

a virtual driver for defining a setpoint trajectory, wherein the setpoint trajectory includes geometric trajectory variables, and for outputting an actual deviation if the vehicle deviates from the setpoint trajectory, a first motion controller, wherein the first motion controller is configured to generate manipulated variables based on the actual deviation such that the vehicle moves closer to the setpoint trajectory during automated control of a drive system and/or a braking system and/or a steering system of the vehicle based on the generated manipulated variables, if the vehicle deviates from the setpoint trajectory, a second motion controller, wherein the second motion controller is configured to ascertain whether an undesirable driving stability state is present for a future time when the vehicle moves closer to the setpoint trajectory based on the generated manipulated variables, wherein the undesirable driving stability state can be ascertained from the specified setpoint trajectory based on the geometric trajectory variables, wherein furthermore at least one logic unit is provided, wherein the at least one logic unit is configured to generate and output a logic signal for the automated control of the drive system and/or of the braking system and/or of the steering system of the vehicle, wherein the logic signal can be generated and output under the undesirable driving stability state based on generated stability variables, and/or the virtual driver is further configured to adapt the setpoint trajectory if the undesirable driving stability state is present.

20. The journey controller as claimed in claim 19, wherein the drive system and/or the braking system and/or the steering system are each assigned a logic unit, wherein the drive system can be controlled automatically with a drive logic signal, the braking system can be controlled automatically with a braking logic signal, and the steering system can be controlled automatically with a steering logic signal.

21. The journey controller as claimed in claim 19, wherein the first motion controller and/or the second motion controller are integrated in the virtual driver; and/or
the first motion controller and the second motion controller are combined; or
at least the second motion controller is implemented separately from the virtual driver and the first motion controller.

22. The journey controller as claimed in claim 19, wherein the second motion controller comprises a yaw rate controller, wherein the yaw rate controller is configured to:
infer the presence of the undesirable driving stability state if a yaw rate deviation between a setpoint yaw rate and an actual yaw rate at the current time and/or for a future time exceeds a deviation limit value, wherein the setpoint yaw rate at the current time and/or for a future time follows from the specified setpoint trajectory based on the geometric trajectory variables, and
determine and output a stability variable based on the yaw rate deviation when the deviation limit value is exceeded.

23. The journey controller as claimed in claim 19, wherein the second motion controller comprises a roll stability control (RSC) unit, wherein the RSC unit is configured to:
infer the presence of the undesirable driving stability state if a lateral acceleration of the vehicle exceeds a limit lateral acceleration at the current time and/or for a future time, and
determine and output a stability variable when the limit lateral acceleration is exceeded.

24. The journey controller as claimed in claim 19, wherein the second motion controller has a stabilization monitor, wherein the stabilization monitor is configured to form a stability indicator based on a current vehicle actual dynamic and the current setpoint trajectory, wherein the stability indicator indicates, based on time, how likely the undesirable driving stability state is at a time between the current time and the future time.

25. The journey controller as claimed in claim 24, wherein the virtual driver is configured to adapt the setpoint trajectory based on the formed stability indicator.

26. A vehicle comprising a journey controller as claimed in claim 19 for automated guidance of the vehicle along a specified setpoint trajectory or an adapted setpoint trajectory.

* * * * *